UNITED STATES PATENT OFFICE.

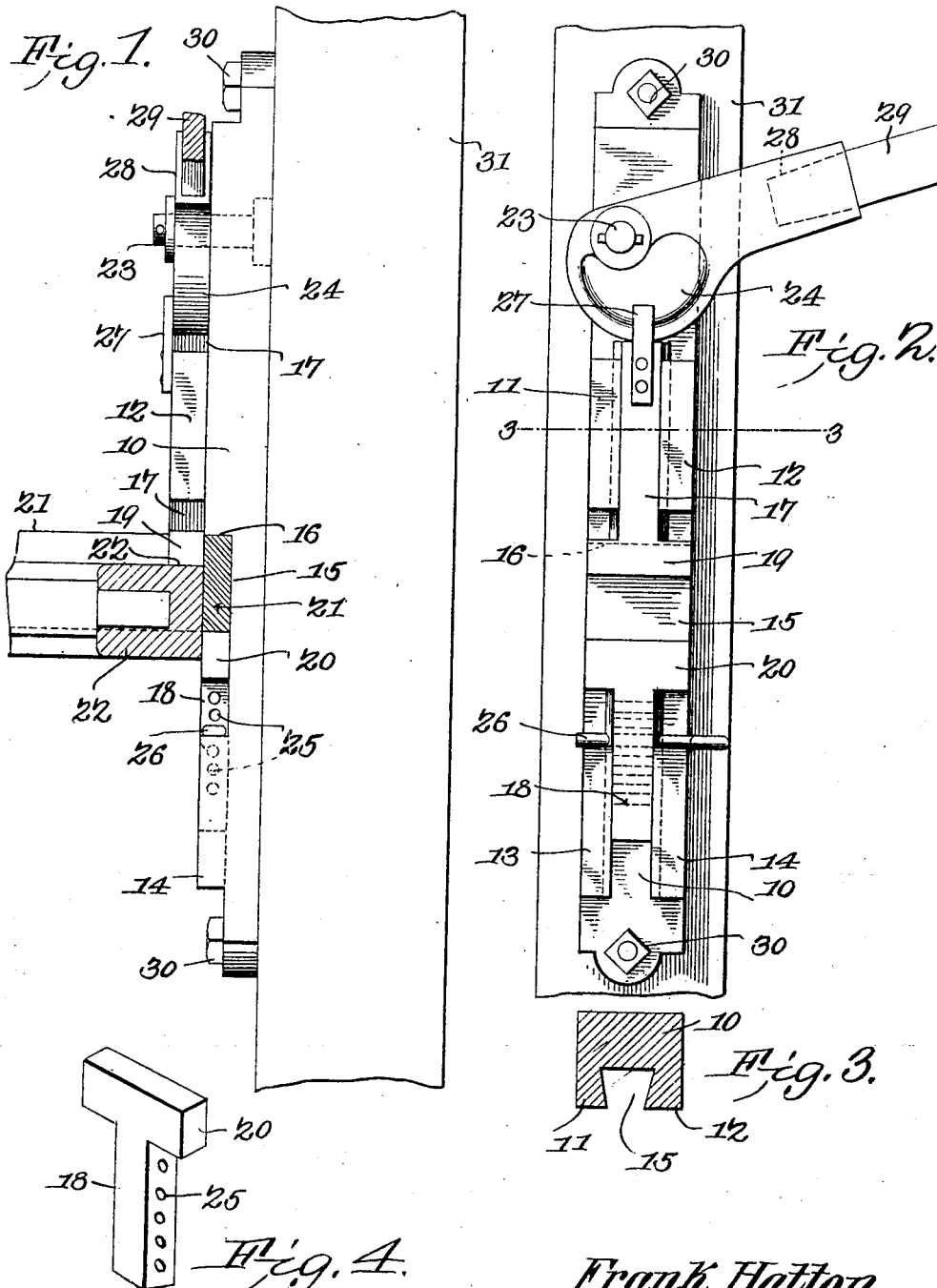

FRANK HATTON, OF PORTERSVILLE, CALIFORNIA.

TIRE-REMOVER.

No. 882,386.  Specification of Letters Patent.  Patented March 17, 1908.

Application filed April 23, 1906. Serial No. 313,347.

*To all whom it may concern:*

Be it known that I, FRANK HATTON, a citizen of the United States, residing at Portersville, in the county of Tulare and State of California, have invented a new and useful Tire-Remover, of which the following is a specification.

This invention relates to devices employed for removing tires from wheels, and has for its object to produce a simply constructed and efficient device of this character, which may be adjusted to fit wheels and tires of various sizes.

With these and other objects in view which will appear as the nature of the invention is better understood, the invention consists in certain novel features of construction as hereafter fully described and claimed.

In the accompanying drawings forming a part of this specification and in which corresponding parts are denoted by like designating characters, is illustrated the preferred form of the embodiment of the invention capable of carrying the same into practical operation.

In the drawings:—Figure 1 is a side elevation, and Fig. 2 is a front elevation, of the improved device. Fig. 3 is a transverse section on the line 3—3 of Fig. 2. Fig. 4 is a perspective view of the stop plunger, detached.

The improved device comprises a stock 10, preferably with means such as bolts 30 for attachment to a support, such as a post 31, or a wall or the like, the stock being of sufficient size to withstand the strains to which the device will be subjected.

The stock 10 is provided with spaced guides 11—12, intermediate thereof, and also provided with spaced guides 13—14 near the other end and spaced from the guides 11—12.

The stock 10 is provided with a recess 15 between the guides 11—12 and 13—14, the guideway between the guides 13—14 being in alinement longitudinally of the stock, and with the recess as represented in Fig. 2, whereby a shoulder 16 is formed near the inner ends of the guides 11—12.

The inner faces of the guides 11—12 and 13—14 are undercut or dove-tailed, as indicated in Fig. 3, and respectively fitting these dove-tailed guideways are plungers 17—18, the plunger 17 having a transverse head 19, and the plunger 18 having a transverse head 20.

It will be noted by reference to Fig. 2 that the two plungers 17—18 with their heads 19—20, do not come in alinement longitudinally of the stock 10. The head 20 of the plunger 18 designed for bearing against the tire, represented at 21, and the head 19 of the plunger 17 designed to bear upon the felly, represented at 22, of the wheel, as represented in Fig. 1.

Extending from the stock 10 above the guides and the plunger 17 is a stud 23, upon which a cam 24 is mounted to swing, and adapted to bear upon the plunger 17, and operate the same.

The plunger 18 is provided with a plurality of transverse apertures 25 to receive, one at a time, a holding pin 26, by which means the plunger may be adjustably supported in its guides 13—14.

The plunger 17 is also provided with a stop 27 over the cam 24, to prevent displacement thereof, and the cam is provided with a socket 28 to receive an operating handle 29 of suitable length, to enable the requisite force to be applied. By this simple means when a tire is to be removed the wheel is supported with its tire 21 within the recess 15 of the stock 10 and bearing against the shoulder 16, and the plunger 18 adjusted by means of its spaced apertures 25 and pin 16 until its head 20 bears against the tire.

The cam 24 is then actuated by its handle 29, causing the plunger 17—19 to bear with sufficient force against the felly 22 to force the latter free from the tire. In operating the device the tire is forced for a short distance from the felly at one point, and the cam released and the wheel rotated to another point, and the cam again operated to force another portion of the tire a short distance from the felly, and so on around the wheel, repeating the action until the felly is forced free from the tire.

The stock 10, its shoulder 16, and the spaced guides 11—12, and 13—14, are cast in one single piece.

The implement is simple in construction, can be inexpensively manufactured, and of any required strength and size, and operates effectually for the purposes described.

Having thus described the invention, what is claimed as new is:—

A tire remover comprising a stock having its intermediate portion provided with a transverse stop shoulder defining a reduced extension, spaced under cut guides secured to the reduced extension, a relatively stationary plunger engaging the under cut walls of the guides and provided with a transverse head adapted to engage the tire for forcing the latter in contact with the stop shoulder, spaced guides extending longitudinally of the upper portion of the stock and off set with respect to the lower guides, said upper guides terminating short of the adjacent end of the stock to form a seating recess and having their inner faces under cut, a relatively movable plunger engaging the under cut edges of the upper guide and provided with an enlarged head adapted to bear against the felly, an eccentric pivotally mounted in the seating recess and provided with an operating handle, a strap secured to the upper plunger and bearing against the eccentric, there being a plurality of transverse recesses formed in the lower plunger, and a pin extending through one of said openings and bearing against the adjacent ends of the lower guides for locking the head of the lower plunger in engagement with the tire.

In testimony that I claim the foregoing as my own, I have hereto affixed my signature in the presence of two witnesses.

FRANK HATTON.

Witnesses:
 ROBT. HORBACH,
 WM. HATTON.